United States Patent
DeVito (10) Patent No.: US 8,596,595 B2
(45) Date of Patent: Dec. 3, 2013

(54) DISPLAY DEVICE

(76) Inventor: John P. DeVito, Mount Prospect, IL (US)

( * ) Notice: Subject to any disclaimer, the term of this patent is extended or adjusted under 35 U.S.C. 154(b) by 154 days.

(21) Appl. No.: 13/190,034

(22) Filed: Jul. 25, 2011

(65) Prior Publication Data

US 2012/0018601 A1 Jan. 26, 2012

Related U.S. Application Data (60) Provisional application No. 61/367,681, filed on Jul. 26, 2010.

(51) Int. Cl.
| | |
|---|---|
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *A47F 5/08* | (2006.01) |
| *A47F 7/00* | (2006.01) |

(52) U.S. Cl.
USPC ............ 248/220.31; 248/220.41; 248/220.42; 248/220.43; 248/220.21; 211/57.1; 211/59.1; 211/26; 211/26.2; 211/86.01

(58) Field of Classification Search
USPC ............ 248/220.31, 220.41, 220.42, 220.43, 248/220.21; 211/57.1, 59.1, 26, 26.2, 211/86.01, 57.01
See application file for complete search history.

(56) References Cited

U.S. PATENT DOCUMENTS

| | | | | |
|---|---|---|---|---|
| 3,799,466 | A | * | 3/1974 | Adams ........................ 242/596.3 |
| 4,619,428 | A | * | 10/1986 | Bailey ........................ 248/220.43 |
| 4,632,256 | A | * | 12/1986 | Gambello ........................ 211/50 |
| 6,266,250 | B1 | * | 7/2001 | Foye .............................. 361/760 |
| 7,694,925 | B2 | * | 4/2010 | Kokenge et al. .......... 248/220.42 |
| 8,302,923 | B2 | * | 11/2012 | Johnston et al. .......... 248/220.41 |
| 2009/0173853 | A1 | * | 7/2009 | Fawcett et al. ............ 248/220.31 |
| 2011/0042331 | A1 | * | 2/2011 | Johnson et al. .............. 211/49.1 |
| 2011/0062294 | A1 | * | 3/2011 | Johnson et al. ................ 248/161 |
| 2011/0068919 | A1 | * | 3/2011 | Rapp et al. .................. 340/568.2 |
| 2012/0018601 | A1 | * | 1/2012 | Devito ...................... 248/220.42 |
| 2012/0205326 | A1 | * | 8/2012 | Richter et al. ...................... 211/4 |
| 2012/0241397 | A1 | * | 9/2012 | Strollo ........................ 211/71.01 |

* cited by examiner

*Primary Examiner* — Terrell McKinnon
*Assistant Examiner* — Christopher Garft
(74) *Attorney, Agent, or Firm* — Wood, Phillips, Katz, Clark & Mortimer (57) ABSTRACT

A device for displaying an article on a peg-board, including first and second housing portions securable to the front face of the peg-board, a recoil mechanism for a cable, and an adapter plate secured to the cable distal end and securable to an article to be displayed. The housing first portion has L-shaped prongs at its top with a distal end extending upwardly adjacent the peg-board back. The housing second portion has L-shaped prongs at its bottom with a distal end extending downwardly adjacent the peg-board back. The housing portions define a substantially enclosed space adjacent the peg-board front face, and the housing first portion defines a housing front face with an opening through the housing front face to the enclosed space. The recoil mechanism is biased toward retracting the cable into the recoil mechanism and disposed in the base housing enclosed space with the cable extending through the housing front face opening with the cable distal end outside the housing enclosed space.

19 Claims, 8 Drawing Sheets

DISPLAY DEVICE

CROSS-REFERENCE TO RELATED APPLICATIONS

This is a non-provisional patent application claiming priority to U.S. Provisional Application Ser. No. 61/367,681, filed Jul. 26, 2010, entitled "Phone Pod". The entirety of the disclosure of Ser. No. 61/367,681 is hereby fully incorporated by reference.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to displays, and more particularly to displays which allow the displayed articles to be seen and handled by interested users.

BACKGROUND OF THE INVENTION

Display of articles intended for sale, for example, in retail stores, are of course well known.

In some instances, it is desirable for the articles to not only be visibly displayed, but also displayed in a manner which will allow a user to pick up and handle the article. For example, cellular phones, computer mouses, handheld calculators, etc. are frequently displayed in this manner to allow potential purchasers to hold the article and thereby gain an appreciation of its size, weight, feel, etc. which might not otherwise be available if the article is viewable only inside a box (or not otherwise viewable at all where the article is expensive enough to require that it be stored in a secure area where potential purchasers cannot access even the box. Further, by making such articles accessible to potential customers, problems with those persons undesirably opening (and perhaps spoiling) packaging in order to see the article can be avoided.

In certain cases, the actual article is itself displayed. Particularly in cases where the article is expensive, various security devices have heretofore been used to prevent the displayed articles from being lost, either through a customer inadvertently walking off with the device, or through deliberate theft. Such displays may commonly include tethering the articles to security cables (to prevent inadvertent taking by potential customers), but also include special cables and electronics which will sound an alarm if the article is removed from the cable or the cable is cut. Further, the base of such displays is often especially configured to protect the remote end of the cable and the associated electronic alarm(s) to protect against access which would allow a thief to disable the security device(s). Still further, such devices typically require a power source for operation. Unfortunately, in many retail stores, for example, such power is not readily available and, even if it is available, locating a closed base as required for such devices is not only relatively expensive, but can also be difficult to build, can take up a disproportionate amount of floor space, and can hinder changing the layout of the store and its shelves should a change be desired later. Thus, such high security displays are not readily susceptible to use in many open displays, such as peg-boards, which are commonly and easily spread throughout retail facilities at locations where electrical power is not always readily available.

In any event, while expensive articles may benefit greatly from relatively expensive security devices having electronic alarms, in many instances the cost associated with protecting the article against theft is not justified relative to the cost of the displayed article itself. For example, the value of the displayed article may be low, or the displayed article(s) may be small non-standalone part(s) of a larger system, or what is displayed may be non-functioning samples which are of no value to a thief while nonetheless serving the function of allowing potential customers to handle the article to appreciate its size, weight, feel, etc.

Unfortunately, many display devices intended for use with low end present their own difficulties. For example, in order to be securely mounted to a wall, some require damaging the wall, and also require the use of special hardware. Further, with some displays, different versions are required to display different articles, and custom designs can increase the cost of the devices as well as making maintenance of adequate inventories of the display devices more costly as well. Still further, the manner of presentation of the articles is sometimes undesirable by, for example, failing to present the articles in an attention catching manner. Additionally, the life of some display devices is affected by their tendency to fray recoil cables.

The present invention is directed toward overcoming one or more of the above problems.

SUMMARY OF THE INVENTION

In one aspect of the present invention, a device for displaying an article on a peg-board is provided, including a base housing having first and second portions securable to the front face of the peg-board, a recoil mechanism having a cable with a distal end, and an adapter plate secured to the cable distal end and securable to an article to be displayed. The housing first portion has at least one L-shaped prong at its top with a distal end extending upwardly adjacent the peg-board back when mounted to the peg-board. The housing second portion has at least one L-shaped prong at its bottom with a distal end extending downwardly adjacent the peg-board back when mounted to the peg-board. The housing first and second portions define a substantially enclosed space adjacent the peg-board front face, and the housing first portion defines a housing front face with an opening through the housing front face to the enclosed space. The recoil mechanism is biased toward retracting the cable into the recoil mechanism and disposed in the base housing enclosed space with the cable extending through the housing front face opening with the cable distal end outside the housing enclosed space.

In one form of this aspect of the present invention, the housing first and second portions each have opposing side walls extending substantially perpendicular from the peg-board with the side walls of the first portion overlapping the side walls of the second portion when mounted on the peg-board. In a further form, the overlapping side walls include interfering portions blocking relative movement perpendicular to the peg-board front face when mounted to the peg-board. In a still further form, the interfering portions are an opening in one of the overlapping side walls and a projection from the other of the overlapping side walls (the projection extending into the one side wall opening when overlapping), whereby one of the one side wall and the projection is elastically flexible whereby the projection may be selectively removed from the one side wall opening. In yet a further form, the other overlapping side wall includes cutouts defining an arm having the projection on an end wherein the arm is elastically bendable.

In another form of this aspect of the present invention, the base housing second portion pivots down over the base housing first portion around the at least one first portion L-shaped prong when mounted to a peg-board to close the enclosed space. In a further form, the housing first and second portions each have opposing side walls extending substantially perpendicular from the peg-board with the side walls of the first portion overlapping the side walls of the second portion when mounted on the peg-board.

In yet another form of this aspect of the present invention, the housing front face includes an oblong depression around the cable front face opening, and the adapter plate includes an oblong projection adapted to be received in the housing front face oblong depression when retracted against the housing front face to orient the adapter plate in a selection position.

In still another form of this aspect of the present invention, the housing front face is generally sloped from bottom to top toward the peg-board when mounted thereon.

Still a further form of this aspect of the present invention includes a fastener extending through holes in the first and second portions, with the holes aligned with each other when the first and second portions are mounted to the peg-board.

In another aspect of the present invention, a device is provided for displaying an article on a peg-board, including a base housing having first and second portions, a recoil mechanism having a cable with a distal end, and an adapter plate secured to the cable distal end whereby the adapter plate is biased toward the housing front face by the recoil mechanism and securable to an article to be displayed. The housing first portion when mounted to the peg-board is adjacent the peg-board front face and has two L-shaped prongs extending through two peg-board support holes with distal ends of the prongs extending in a first direction adjacent the peg-board back. The housing second portion when mounted to the peg-board has an L-shaped prong extending through one of the peg-board support holes with a distal end of the L-shaped prong extending in a second direction adjacent the peg-board back, the second direction being opposite the first direction. The housing first and second portions define a substantially enclosed space adjacent the peg-board front face, and one of the housing first and second portions defines a housing front face with an opening through the housing front face to the enclosed space. The recoil mechanism is biased toward retracting the cable into the recoil mechanism, and is disposed in the base housing enclosed space with the cable extending through the housing front face opening with the cable distal end outside the housing enclosed space.

In one form of this aspect of the present invention, the housing first and second portions each have opposing side walls extending substantially perpendicular from the peg-board with the side walls of the first portion overlapping the side walls of the second portion when mounted on the peg-board. In a further form, the overlapping side walls are detachably secured. In a still further form, the interfering portions are an opening in one of the overlapping side walls and a projection from the other of the overlapping side walls (the projection extending into the one side wall opening when overlapping), whereby one of the one side wall and the projection is elastically flexible whereby the projection may be selectively removed from the one side wall opening. In yet a further form, the other overlapping side wall includes cutouts defining an arm having the projection on an end wherein the arm is elastically bendable.

In another form of this aspect of the present invention, the base housing second portion pivots down over the base housing first portion around the first portion L-shaped prong when mounted to a peg-board to close the enclosed space. In a further form, the housing first and second portions each have opposing side walls extending substantially perpendicular from the peg-board with the side walls of the first portion overlapping the side walls of the second portion when mounted on the peg-board.

In yet another form of this aspect of the present invention, the housing front face includes an oblong depression around the cable front face opening, and the adapter plate includes an oblong projection adapted to be received in the housing front face oblong depression when retracted against the housing front face to orient the adapter plate in a selection position.

In still another form of this aspect of the present invention, the housing front face is generally sloped from bottom to top toward the peg-board when mounted thereon.

Other objects, features, and advantages of the invention will become apparent from a review of the entire specification, including the appended claims and drawings.

DETAILED DESCRIPTION OF THE PREFERRED EMBODIMENT

Figure 1:
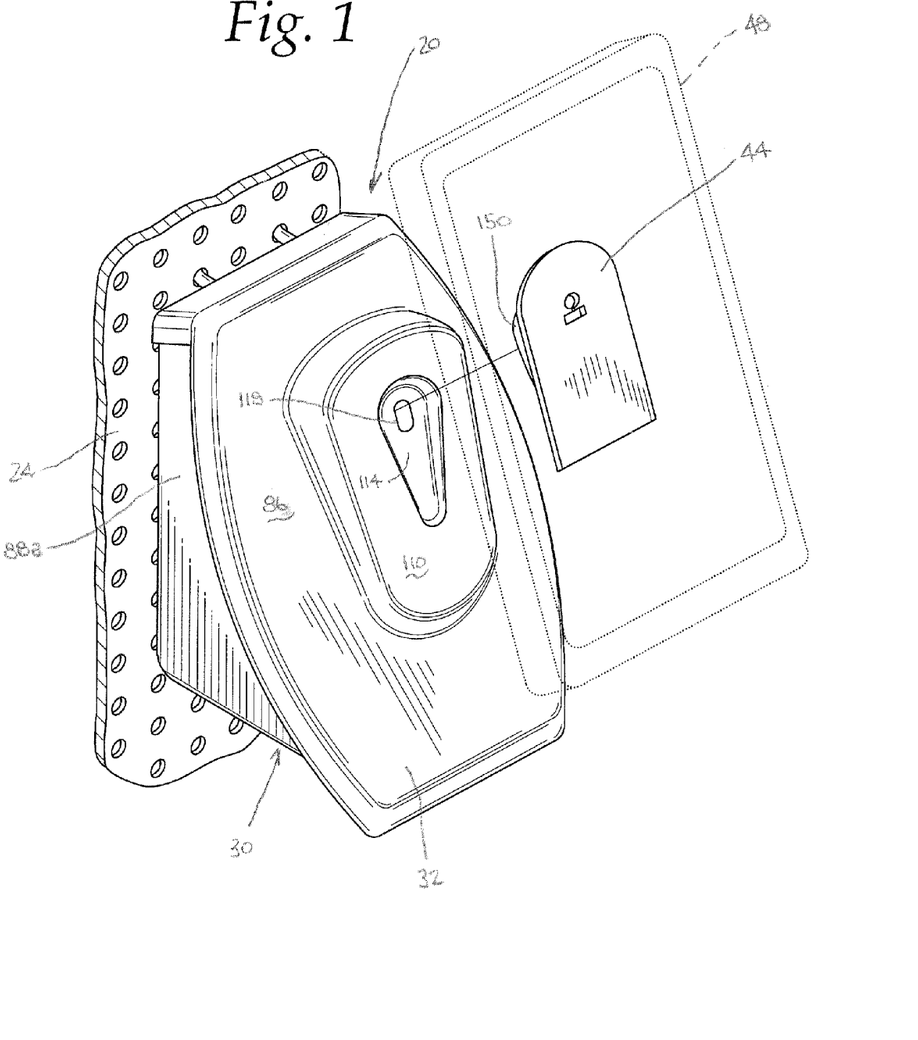
FIG. 1 is a perspective view of an embodiment of a display device according to the present invention as mounted on a peg-board, with a displayed article shown in phantom.
Figure 2:
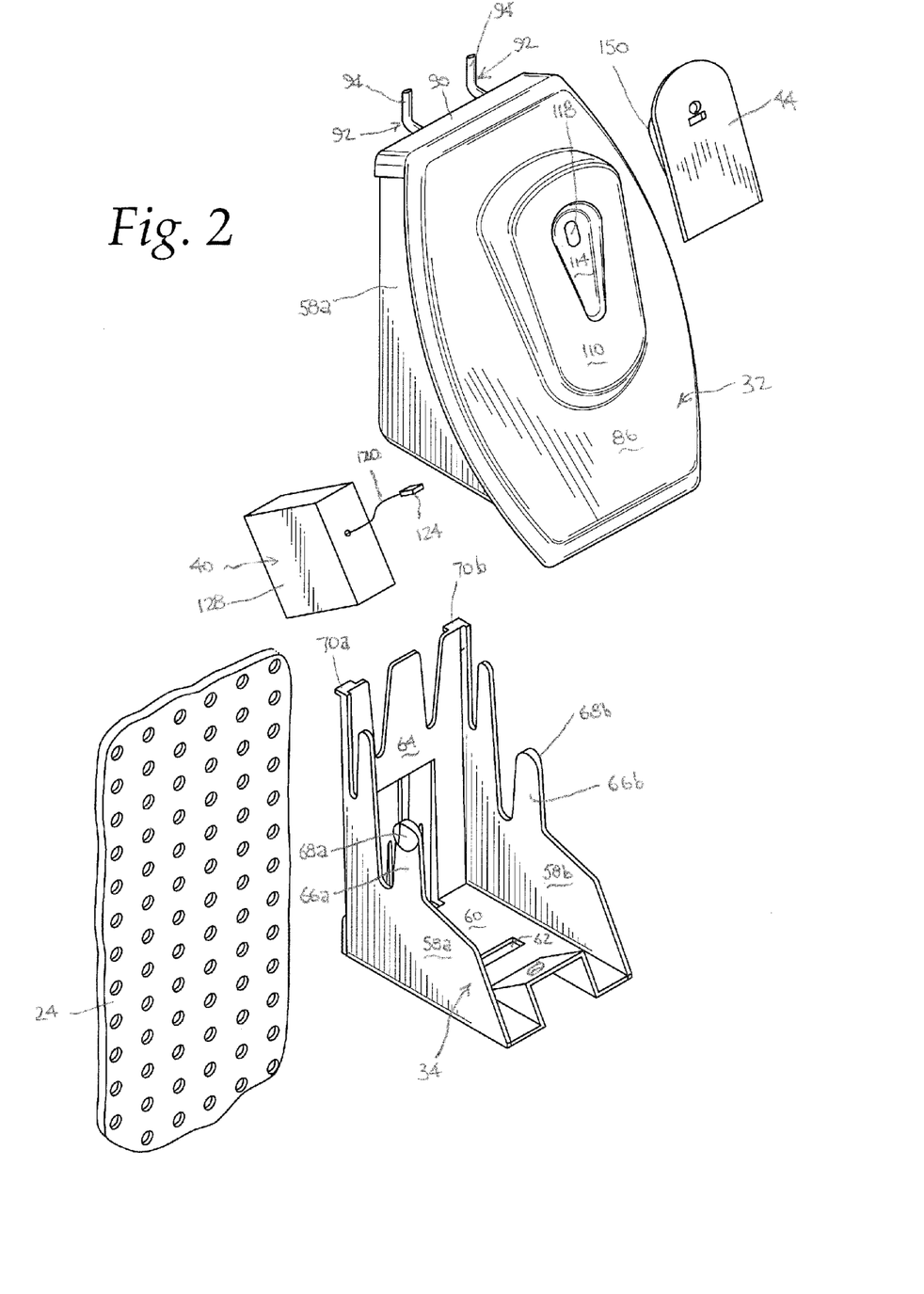
FIG. 2 is an exploded perspective view of the FIG. 1 display device and peg-board.

A display device 20 according to the present invention is shown in FIG. 1, mounted to a peg-board 24. As best illustrated in FIG. 2, the device 20 generally consists of a base housing 30 (consisting of an upper or front base housing portion 32 and a lower or rear base housing portion 34), a recoil mechanism 40, and an adapter plate 44, and is advantageously suited for displaying an article 48 (in phantom in FIG. 1) to gain the attention of potential purchasers as well as to allow such potential purchasers to handle the article 48. The front and rear base housing portions 32, 34, which may be advantageously molded from poly-carbonate (a recyclable plastic), together define a substantially enclosed space adjacent the front face of the peg-board 24.

It should be understood that references herein to "peg-boards" are intended to include not only peg-boards such as are known in the industry, but include any surface having holes therethrough for mounting thereon. Thus, peg-board as used herein also includes, for example, substrates such as slat walls (e.g., with horizontal slats having suitable separation, such as 4 inches on center, wherein the "holes" are horizontal slots), corrugated material (e.g., corrugated paper, such as in temporary displays, with holes die cut in an appropriate pattern) and punched metal (e.g., 18 to 20 gauge metal with an adapter plate, with holes therethrough to which the display device 20 described herein may be secured.

Figure 3:
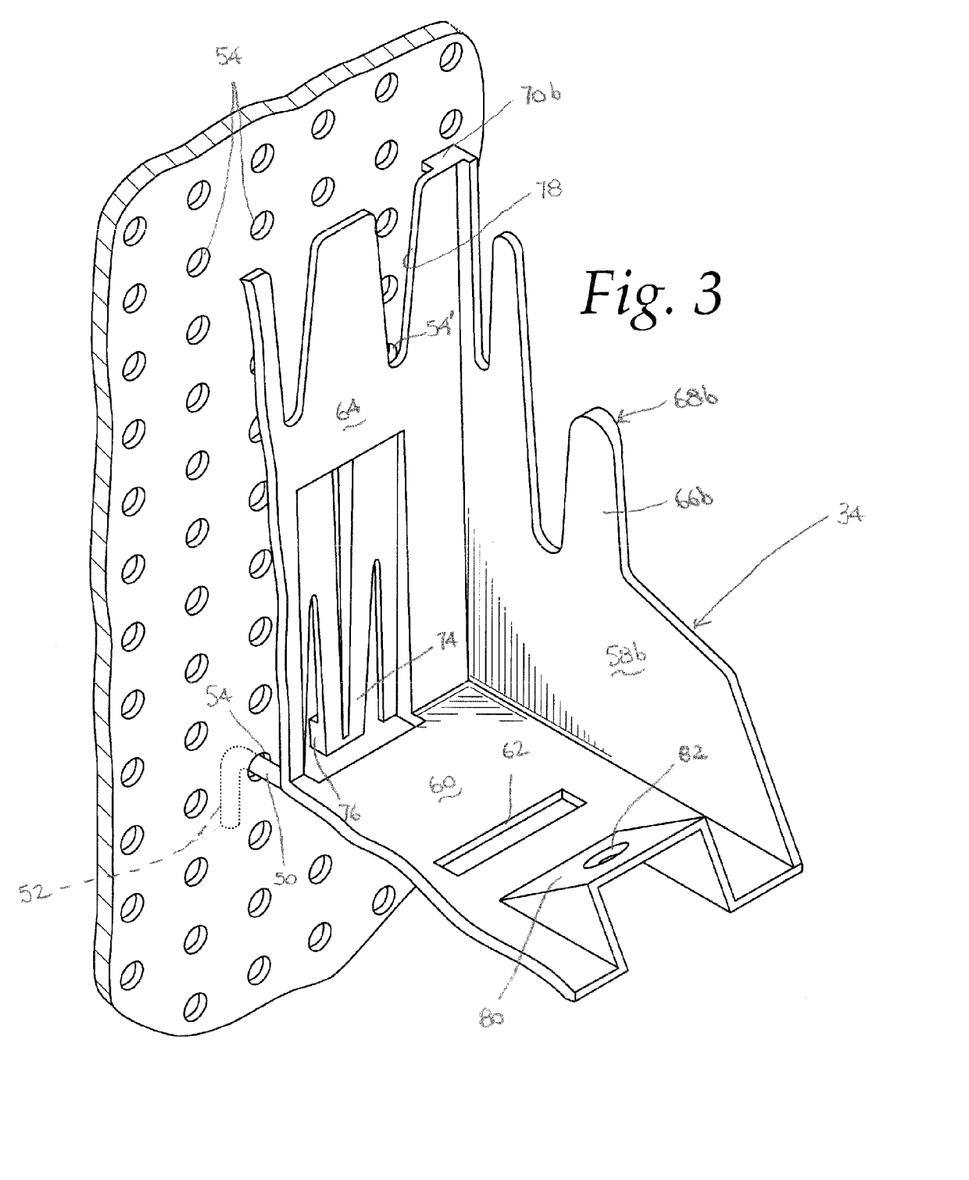
FIG. 3 is a partially broken away view of a rear base housing portion as mounted on a peg-board during assembly.

When installed, the rear base housing portion 34 is first attached to the peg-board 24 as shown in FIG. 3. The rear base housing portion 34 has L-shaped prongs 50 generally at the bottom of the rear base housing portion 34, whereby the prong distal ends 52 are first extended through holes 54 in the peg-board 24 and the rear base housing portion 34 is then pivoted up so that the prong distal ends 52 extend down, behind and generally parallel to the back of the peg-board 24.

Figure 4:
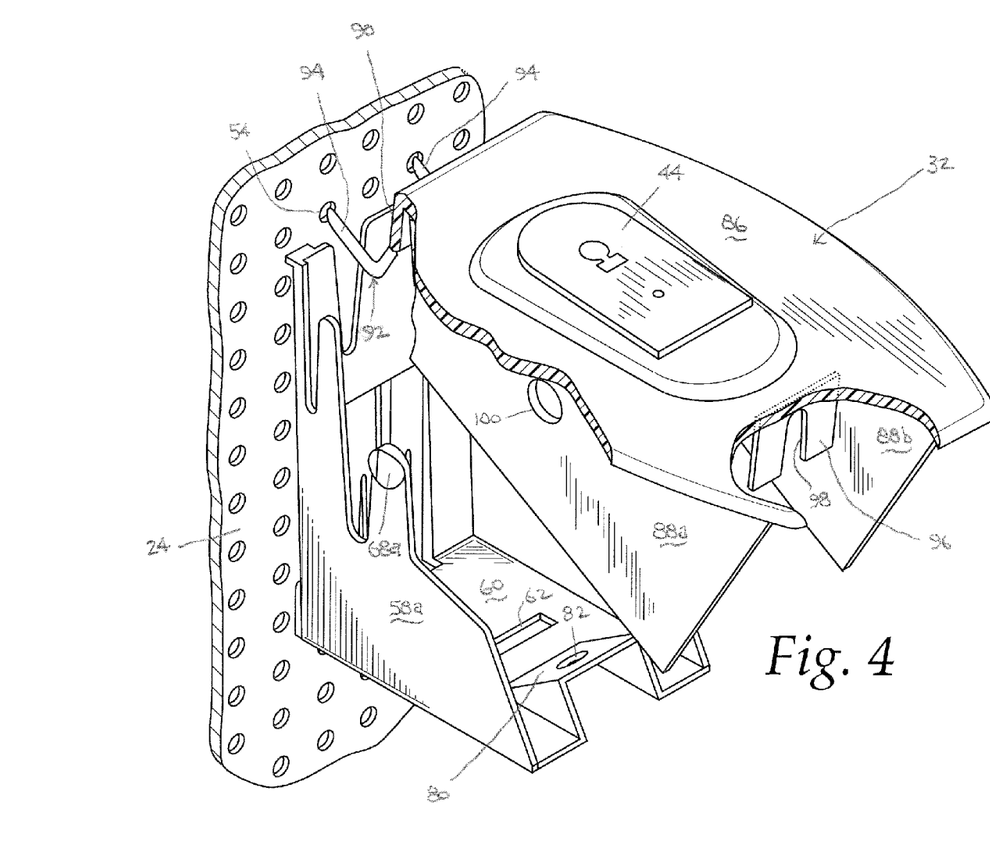
FIG. 4 is a partially broken away view showing the mounting of a front base housing portion onto a peg-board having a rear base housing portion thereon as in FIG. 3.

The rear base housing portion 34 also includes opposing side walls 58a, 58b (see FIG. 4) which extend substantially perpendicular from the peg-board 24, a bottom 60 having an opening 62, and a rear wall 64.

The bottom opening 62 may be advantageously used to attach a counter mount accessory device when mounted to a horizontal surface. That is, a counter adapter may be mounted to a substantially horizontal counter, with upward pointing flanges with flared ends being received in the opening 62 to secure the rear base housing portion 34 thereto.

The side walls 58a, 58b each include cutouts which define upwardly extending arms 66a, 66b having outwardly extending projections 68a, 68b on their upper ends. The arms 66a, 66b are elastically flexible or bendable so that they may be bent by application of a force and return to their original configuration when the force is released.

The rear wall 64 advantageously includes rearwardly extending tabs 70a, 70b at the upper corners, and a centered leg 74 with a rearwardly extending tab 76 at its lower end. The leg 74 is elastically flexible or bendable so that it may be bent by application of a force and return to its original configuration when the force is released. Additionally, one or more slots 78 (see FIG. 3) are provided in the top of the rear wall 64, and at their bottom are aligned with an intermediate hole 54'. It will be appreciated that in relatively permanent merchandise displays, a suitable clip may be used to also secure the back wall 64 to the peg-board 24 through the hole 54' in the slot 78 (as this will secure the rear base housing portion 34 against tipping forward on the peg-board 24 while the front base housing portion 32 is mounted thereon as illustrated, e.g., in FIG. 4).

In addition to the opening 62, the bottom 60 includes a flange 80, sloped upwardly from back to front, with a hole 82 therein.

The front base housing portion 32 includes a front face 86 which is oriented so as to be generally sloped from bottom to top toward the peg-board 24 when mounted thereon (as shown, e.g., in FIG. 1). The front base housing portion 32 also includes opposing side walls 88a, 88b which extend substantially perpendicular from the peg-board 24, and overlap the side walls 58a, 58b of the rear base housing portion 34 when mounted on the peg-board 24.

Figure 4A:
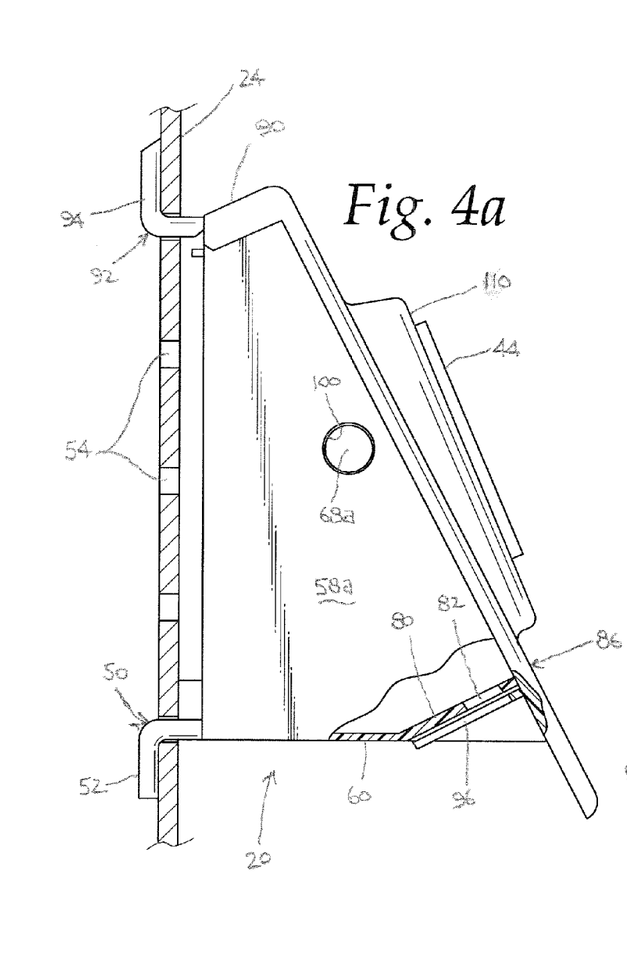
FIG. 4a is a side, partially broken away, view showing the FIG. 1 base housing mounted to a peg-board.

The front base housing portion 32 also includes a top wall 90 having a pair of L-shaped prongs 92, whereby the prong distal ends 94 are first extended through holes 54 in the peg-board 24 and the front base housing portion 32 is then pivoted down over the rear base housing portion 30 so that the prong distal ends 94 extend up, behind and generally parallel to the back of the peg-board 24 (see particularly FIG. 4a). It should be appreciated that when mounted in this manner, the tabs 70a, 70b, 76 of the rear base housing portion 30 will press against the front of the peg-board 24 such that the prong distal ends 52, 94 will be positioned against the back of the peg-board 24 so that the display device 20 will be securely mounted without looseness which might allow the device 20 to wiggle or move. Such pressure additionally compensates for panel thickness variance (e.g., some peg-boards are 6 mm [or about 0.219 to 0.225 inch], while others are ¼ inch [or about 0.245 to 0.255 inch]), allowing the display device 20 to be readily used with different panels.

A flange 96 extends from the rear of the front face 86 and includes a hole or a slot 98. The flange 90 is oriented so that it will pivot over and against the rear base housing portion flange 80 when the front base housing portion 32 is mounted as show, for example, in FIG. 4a. A suitable connector, such as a screw, or nut and bolt, may be secured through the aligned hole 82 and slot 98 to secure the base housing portions 32, 34 together when mounted on the peg-board 24, if desired.

Additionally, the side walls 88a, 88b of the front base housing portion 32 include holes 100. When the side walls 58a, 58b and 88a, 88b slide past each other when mounting the front base housing portion 32, the lateral projections 68a, 68b are pushed in (flexing the arms 66a, 66b inwardly of the housing) until the holes 100 are aligned with the projections 68a, 68b, at which point the arms 661, 66b will bend back out and push the projections 68a, 68b into the holes 100 to secure the rear and front base housing portions 32, 34 together. When thereafter removing the front base housing portion 32, the projections 88a, 88b may be pushed back inwardly by pushing through the holes 100 until they are clear of the holes 100, at which point the front base housing portion 32 may be pivoted up.

The front base housing portion 32 of the illustrated embodiment includes a raised area 110 to allow for prominent presentation of the article being displayed, and also to provide space from the front face 86 of the front base housing portion 32 to facilitate grasping of the displayed article. Further, the raised area 110 includes an oblong depression 114 with a cable opening 118 therein.

The recoil mechanism 40 includes cable 120 having a head 124 on its distal end remote from the mechanism housing 128. The recoil mechanism 40 may be of any suitable type which allows the cable 128 to be extended from the housing 128 when pulled out, with the cable 128 being biased toward retracting into the housing 128. Mechanisms such as those which use a spring biasing a spool toward rotating in a direction which will wind the cable 120 around the spool can, for example, advantageously minimize the amount of cable 120 extended out of the housing 128, and fully retract the cable 128 when it is released.

Figure 4B:
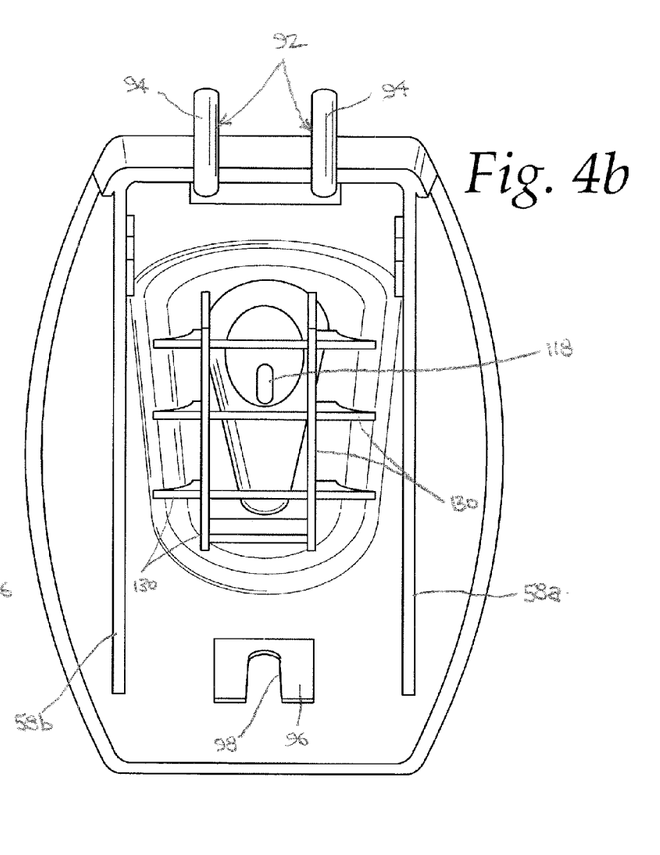
FIG. 4b is a rear view of the front base housing portion, showing the back of the front face of the display device.
Figure 5:
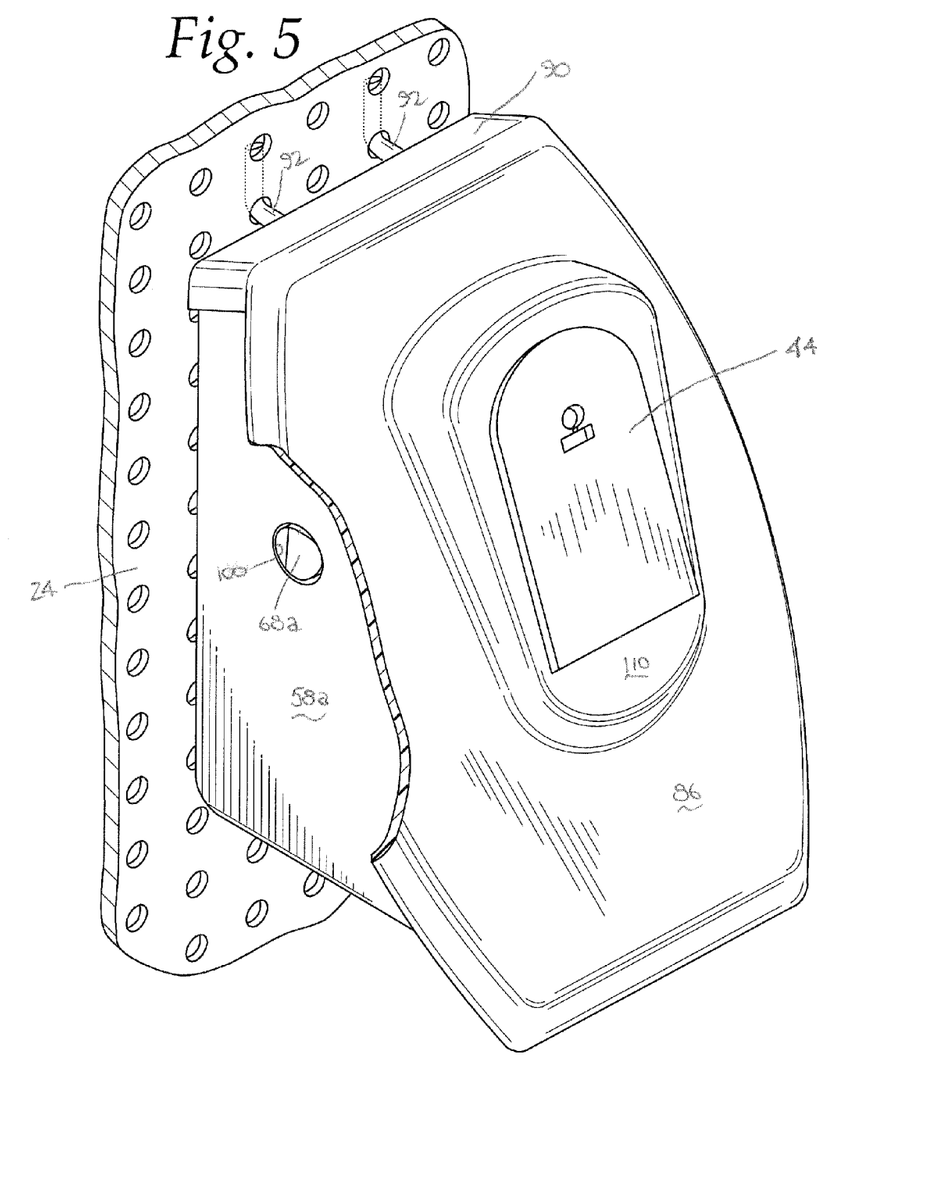
FIG. 5 is a perspective view of the FIG. 1 display device mounted to a peg-board.

The back side of the front base housing portion 32 of the illustrated embodiment includes a grid of supporting flanges 130 which are configured to support and orient the housing 128 of the recoil mechanism 40 so that the cable 120 is aligned with the cable opening 118.

Figures 6, 7:
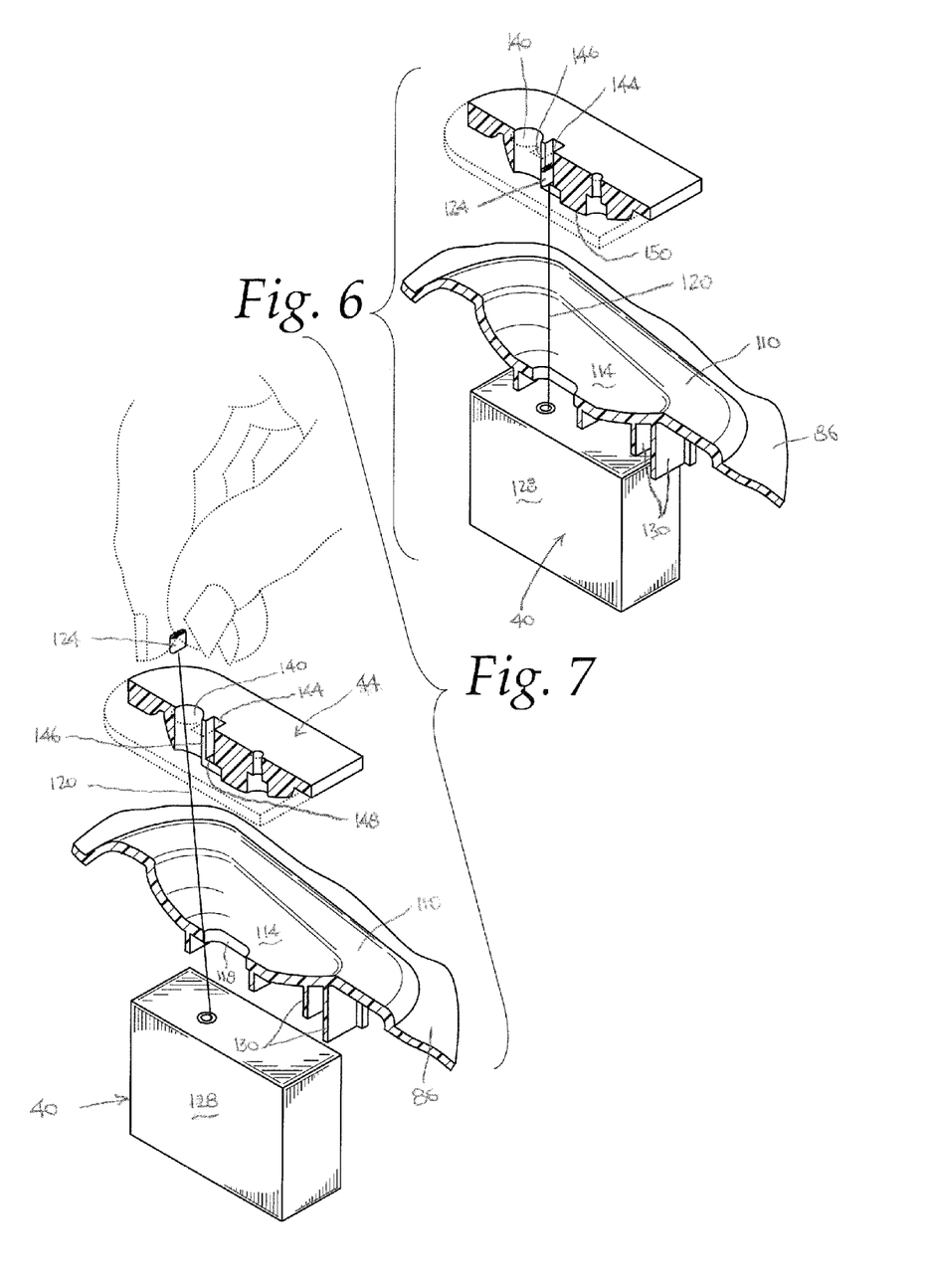
FIG. 6 is a broken away view showing the arrangement of the recoil mechanism as attached to one embodiment of an adapter plate through the front base housing portion.
FIG. 7 is a broken away view similar to FIG. 6, but illustrating a manner of attaching the adapter plate to the recoil mechanism.

An adapter plate 44 is suitably secured to the distal end of the cable 120. For example, as illustrated in FIGS. 6-7, the head 124 may be pulled to extend the cable 120 from the recoil mechanism housing 128 and through both the cable opening 118 and a first opening 140 in the adapter plate 44. The first opening 140 is larger than the cable head 124 and is connected to a second opening 144 by a slot 146. The second opening 144 has a bottom shoulder 148 which defines a reduction in the bottom of the second opening 144 which is smaller than the cable head 124.

Thus, the cable 120 can be secured to the adapter plate 44 by pulling the head through the first opening 140 as shown in FIG. 7, then pulling the cable 120 through the slot 146 to align the head 124 with the second opening 144 and releasing the head 124 (whereby the recoil mechanism 40 will pull the cable 120 through the second opening 144 and cause the head 124 to seat on the shoulder 148, as shown in FIG. 6).

It should be appreciated that the recoil mechanism 40 may be secured to the back of the front base housing portion front face 86, or it may be loosely retained against the supporting flanges 130 by the pull of the cable biasing force.

The adapter plate 44 as illustrated advantageously includes an oblong projection 150 on its back side which is adapted to be received in the housing front face oblong depression 114 when retracted by the recoil mechanism 40. The oblong projection 150 will cooperate with the oblong depression 114 to facilitate return of the adapter plate 44 when released whereby the displayed article is oriented in a desired merchandising position.

In accordance with at least some aspects of the present invention, the displayed article 48 may be secured to the adapter plate 44 in any suitable manner. For example, suitable adhesives or glues may be used, or tape or pads having adhesives on both sides may be used. The article 48 may also be mechanically secured, as by a screw through the adapter plate 44.

FIGS. 8-11 illustrate a two-part adapter plate 44' which may be advantageously incorporated with the display device 20 of the present invention.

Figures 8, 9:
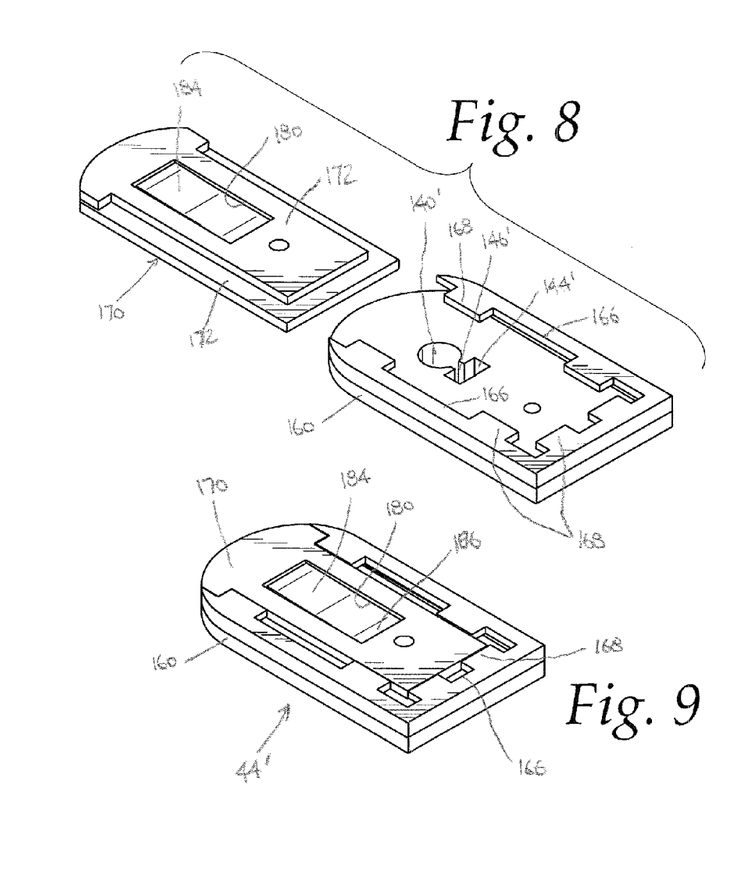
FIG. 8 is a perspective exploded view showing a second embodiment of an adapter plate.
FIG. 9 is a perspective view showing both parts of the FIG. 8 adapter plate connected together.
Figure 10:
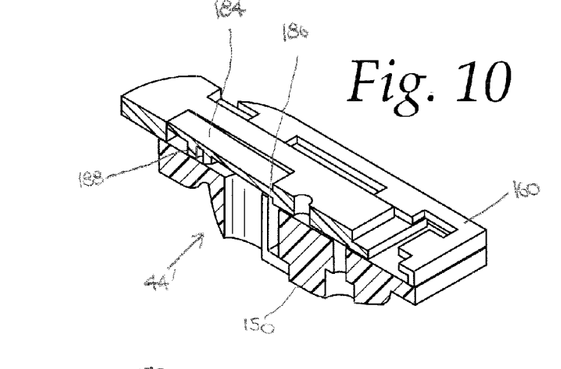
FIG. 10 is a cross-sectional view of the FIG. 8 adapter plate showing the parts only partially connected, such as when being connected together or taken apart.

The adapter plate 44' includes a base member 160 with first and second openings 140', 144' and a slot 146' in between the openings 140', 144' for securing to the cable 120 via the cable head 124 such as previously described. The base member 160 also includes a raised lip around three sides including inwardly extending lips 166 and flanges 168 defining a slot open on one side into which the connecting member 170 may be slid.

The connecting member 170 includes a raised center portion 172 having a thinner rim 172 around three sides which may be slid into the slot defined by the lips 166 and flanges 168 of the base member 160. The center potion 172 may be suitably secured to the displayed article 48 such as previously described. The center portion 172 includes a slot 180 therethrough, with an arm 184 in the slot 180 and secured at one end 186 so that the arm 184 is biased toward the base member 160. A raised portion 188 on the back side of the arm 184 will thus engage the top of the base member 160 when the connecting member 170 is slid into the base member slot (see FIG. 10). The raised portion 188 is positioned so as to be aligned with the base member first opening 140' when the connecting member 170 is fully in the base member slot, whereby the biasing of the arm 184 will cause the raised portion 188 to move into the first opening 140' (see FIG. 11) and thereby retain the connecting member 170 (and connected article 48) on the base member 160. The connecting member 170 thus also covers the second opening 144' to securely retain the cable head 124 therein as well.

Should it be later desired to remove the connecting member 170 from the base member 160 (e.g., to switch to a different base member 160 secured to a different display article), a tool such as a rod or screwdriver can be pushed through the first opening 140' from the back to bend the arm 184 and move the raised portion 188 out of the first opening 140', whereby the connecting member 170 may be slid out of the base member slot.

Figure 11:
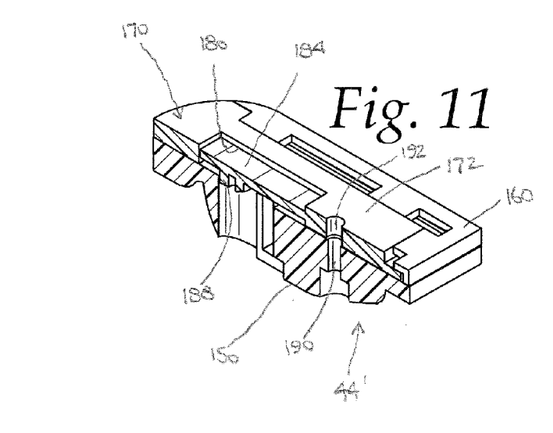
FIG. 11 is a cross-sectional view of the FIG. 8 adapter plate showing the parts secured together.

Additionally, the base member 160 and connecting member 170 may include holes (190, 192, respectively) which will be aligned when the connecting member 170 is seated in the base member slot (see FIG. 11). A suitable connector such as a screw or pin may be pushed through both holes 190, 192 to also (or alternatively) secure the base and connecting members 160, 170 from being slit apart.

It should thus be appreciated that display devices according to the present invention will provide secure displays for articles at a small cost. Moreover, it should also be appreciated that display devices according to the present invention will provide secure displays which may be easily used in connection with displays (such as peg-boards) which are already common in retail stores, and which may be easily placed at or moved to virtually any store location, while also being readily adaptable for use with a variety of articles to be displayed. Further, using display devices according to the present invention to set up and change displays may be readily accomplished by store personnel with only minimal training. Still further, it should be appreciated that display devices according to the present invention may be environmentally friendly, as they may be made of, and used with, inexpensive, easy to use materials which may be recycled.

The invention claimed is:

1. A device for displaying an article on a peg-board having a plurality of spaced support holes extending through from the peg-board front face to the peg-board back, comprising:
   a base housing having first and second portions securable to the front age of the peg-board,
      said first portion having at least one L-shaped prong at its top with a distal end extending upwardly adjacent said peg-board back when mounted to said peg-board,
      said second portion having at least one L-shaped prong at its bottom with a distal end extending downwardly adjacent said peg-board back when mounted to said peg-board,
      said first and second portions each having opposing side walls extending substantially perpendicular from the peg-board with said side walls of said first portion overlapping said side walls of said second portion when mounted on the peg-board,
      said overlapping side walls including interfering portions blocking relative movement perpendicular to said peg-board front face when mounted to said peg-board,
      said interfering portions having an opening in one of said overlapping side walls; and
         a projection from the other of said overlapping side walls, said projection extending into said one side wall opening when overlapping;
         whereby one of said one side wall and said projection is elastically flexible whereby said projection may be selectively removed from said one side wall opening;
      whereby
         said first and second portions define a substantially enclosed space adjacent said peg-board front face, and
         said first portion defines a housing front face with an opening through said housing front face to said enclosed space;

a recoil mechanism having a cable with a distal end, said recoil mechanism biased toward retracting said cable into said recoil mechanism, and
disposed in said base housing enclosed space with said cable extending through said housing front face opening with said cable distal end outside said housing enclosed space; and
an adapter plate secured to said cable distal end and securable to an article to be displayed.

2. The device of claim 1, wherein said other overlapping side wall includes cutouts defining an arm having said projection on an end wherein said arm is elastically bendable.

3. A device for displaying an article on a peg-board having a plurality of spaced support holes extending through from the peg-board front face to the peg-board back, comprising:
a base housing having first and second portions securable to the front face of the peg-board,
said first portion having at least one L-shaped prong at its top with a distal end extending upwardly adjacent said peg-board back when mounted to said peg-board,
said second portion having at least one L-shaped prong at its bottom with a distal end extending downwardly adjacent said peg-board back when mounted to said peg-board,
said base housing second portion pivots down over said base housing first portion around said at least one first portion L-shaped prong when mounted to a peg-board to close said enclosed space;
whereby
said first and second portions define a substantially enclosed space adjacent said peg-board front face, and
said first portion defines a housing front face with an opening through said housing front face to said enclosed space,
a recoil mechanism having a cable with a distal end, said recoil mechanism biased toward retracting said cable into said recoil mechanism, and
disposed in said base housing enclosed space with said cable extending through said housing front face opening with said cable distal end outside said housing enclosed space; and
an adapter plate secured to said cable distal end and securable to an article to be displayed.

4. The device of claim 3, wherein said housing first and second portions each have opposing side walls extending substantially perpendicular from the peg-board with said side walls of said first portion overlapping said side walls of said second portion when mounted on the peg-board.

5. The device of claim 1, wherein said housing front face includes an oblong depression around said cable front face opening, and said adapter plate includes an oblong projection adapted to be received in said housing front face oblong depression when retracted against said housing front face to orient said adapter plate in a selection position.

6. The device of claim 1, wherein said housing front face is generally sloped from bottom to top toward said peg-board when mounted thereon.

7. A device for displaying an article on a peg-board having a plurality of spaced support holes extending through from the peg-board front face to the peg-board back, comprising:
a base housing having first and second portions securable to the front face of the peg-board,
said first portion having at least one L-shaped prong at its top with a distal end extending upwardly adjacent said peg-board back when mounted to said peg-board,
said second portion having at least one L-shaped prong at its bottom with a distal end extending downwardly adjacent said peg-board back when mounted to said peg-board,
whereby
said first and second portions define a substantially enclosed space adjacent said peg-board front face, and
said first portion defines a housing front face with an opening through said housing front face to said enclosed space;
a fastener extending through holes in said first and second portions, said holes being aligned with each other when said first and second portions are mounted to said peg-board;
a recoil mechanism having a cable with a distal end, said recoil mechanism biased toward retracting said cable into said recoil mechanism, and
disposed in said base housing enclosed space with said cable extending through said housing front face opening with said cable distal end outside said housing enclosed space; and
an adapter plate secured to said cable distal end and securable to an article to be displayed.

8. A device for displaying an article, said device for use with a peg-board having a plurality of spaced support holes extending through from the peg-board front face to the peg-board back, comprising:
a base housing having first and second portions,
said first portion when mounted to said peg-board being adjacent said peg-board front face and having two L-shaped prongs extending through two peg-board support holes with distal ends of said prongs extending in a first direction adjacent the peg-board back,
said second portion when mounted to said peg-board having at least one L-shaped prong extending through one of said peg-board support holes with a distal end of said at least one L-shaped prom extending in a second direction adjacent the peg-board back, said second direction being opposite said first direction,
said first and second portions each having opposing side walls extending substantially perpendicular from the peg-board with said side walls of said first portion overlapping said side walls of said second portion when mounted on the peg-board,
said overlapping side walls are detachably secured,
one of said side walls has an opening therein and the overlapping side wall includes a projection extending into said one side wall opening when overlapping, and
one of said one side wall and said projection is elastically flexible whereby said projection may be selectively removed from said one side wall opening;
whereby
said first and second portions define a substantially enclosed space adjacent said peg-board front face, and
one of said first and second portions defines a housing front face with an opening through said housing front face to said enclosed space;
a recoil mechanism having a cable with a distal end, said recoil mechanism biased toward retracting said cable into said recoil mechanism, said recoil mechanism being disposed in said base housing enclosed space with said cable extending through said housing front face opening with said cable distal end outside said housing enclosed space; and an adapter plate secured to said cable distal end whereby said adapter plate is biased toward said housing front face by said recoil mechanism, said adapter plate being securable to an article to be displayed.

9. The device of claim 8, wherein said other overlapping side wall includes cutouts defining an arm having said projection on an end wherein said arm is elastically bendable.

10. A device for displaying an article, said device for use with a peg-board having a plurality of spaced support holes extending through from the peg-board front face to the peg-board back, comprising:

a base housing having first and second portions, said first portion when mounted to said peg-board being adjacent said peg-board front face and having two L-shaped prongs extending through two peg-board support holes with distal ends of said prongs extending in a first direction adjacent the peg-board back.

said second portion when mounted to said peg-board having at least one L-shaped prong extending through one of said peg-board support holes with a distal end of said at least one L-shaped prong extending in a second direction adjacent the peg-board back, said second direction being opposite said first direction, said base housing second portion pivots down over said base housing first portion around said at least one L-shaped prong when mounted to a peg-board to close said enclosed space;

whereby said first and second portions define a substantially enclosed space adjacent said peg-board front face, and one of said first and second portions defines a housing front face with an opening through said housing front face to said enclosed space;

a recoil mechanism having a cable with a distal end, said recoil mechanism biased toward retracting said cable into said recoil mechanism, said recoil mechanism being disposed in said base housing enclosed space with said cable extending through said housing front face opening with said cable distal end outside said housing enclosed space; and an adapter plate secured to said cable distal end whereby said adapter plate is biased toward said housing front face by said recoil mechanism, said adapter plate being securable to an article to be displayed.

11. The device of claim 10, wherein said housing first and second portions each have opposing side walls extending substantially perpendicular from the peg-board with said side walls of said first portion overlapping said side walls of said second portion when mounted on the peg-board.

12. The device of claim 8, wherein said housing front face includes an oblong depression around said cable front face opening, and said adapter plate includes an oblong projection adapted to be received in said housing front face oblong depression when retracted against said housing front face to orient said adapter plate in a selection position.

13. The device of claim 8, wherein said housing front face is generally sloped from bottom to top toward said peg-board when mounted thereon.

14. The device of claim 3, wherein said housing front face includes an oblong depression around said cable front face opening, and said adapter plate includes an oblong projection adapted to be received in said housing front face oblong depression when retracted against said housing front face to orient said adapter plate in a selection position.

15. The device of claim 3, wherein said housing front face is generally sloped from bottom to top toward said peg-board when mounted thereon.

16. The device of claim 7, wherein said housing front face includes an oblong depression around said cable front face opening, and said adapter plate includes an oblong projection adapted to be received in said housing front face oblong depression when retracted against said housing front face to orient said adapter plate in a selection position.

17. The device of claim 7, wherein said housing front face is generally sloped from bottom to top toward said peg-board when mounted thereon.

18. The device of claim 10, wherein said housing front face includes an oblong depression around said cable front face opening, and said adapter plate includes an oblong projection adapted to be received in said housing front face oblong depression when retracted against said housing front face to orient said adapter plate in a selection position.

19. The device of claim 10, wherein said housing front face is generally sloped from bottom to top toward said peg-board when mounted thereon.

* * * * *